(12) United States Patent
Jung

(10) Patent No.: US 7,255,209 B2
(45) Date of Patent: Aug. 14, 2007

(54) INTEGRATED SUSPENSION SYSTEM FOR VEHICLE

(75) Inventor: Joon Chai Jung, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 173 days.

(21) Appl. No.: 11/006,673

(22) Filed: Dec. 8, 2004

(65) Prior Publication Data

US 2006/0049013 A1    Mar. 9, 2006

(30) Foreign Application Priority Data

Sep. 3, 2004    (KR) .................. 10-2004-0070198

(51) Int. Cl.
*F16F 9/34* (2006.01)
(52) U.S. Cl. ............. 188/266.4; 188/317; 267/64.15
(58) Field of Classification Search ............. 188/285, 188/317, 319.2, 322.15, 322.19, 299.1, 266.4; 267/124, 64.15
See application file for complete search history.

(56) References Cited

U.S. PATENT DOCUMENTS

| | | | | |
|---|---|---|---|---|
| 4,673,067 A | * | 6/1987 | Munning et al. | ........ 188/266.4 |
| 5,533,597 A | * | 7/1996 | Nezu et al. | ............... 188/266.4 |
| 5,704,588 A | * | 1/1998 | Korfgen et al. | ............. 251/208 |
| 6,951,267 B2 | * | 10/2005 | Heo | ........................ 188/266.3 |

* cited by examiner

*Primary Examiner*—Bradley King
(74) *Attorney, Agent, or Firm*—Greenblum & Bernstein, P.L.C.

(57) ABSTRACT

An integrated suspension system includes a cylinder that hermetically contains gas therein; a piston that has a motor at an upper portion thereof; a disk unit including a second disk that has a plurality of passage holes formed there through and a bottom surface coupled to a driving shaft of the motor to rotate while moving vertically integrally along with the piston, and a first disk that has a plurality of passage holes and is stacked on and connected via a hinge to the center of a top surface of the second disk to move vertically within the cylinder integrally along with the second disk without any rotation; and a control unit that controls an opening degree established through overlap of the passage holes formed in the first and second disks by changing power supplied to the motor to control a rotational angle of the second disk.

6 Claims, 4 Drawing Sheets

INTEGRATED SUSPENSION SYSTEM FOR VEHICLE

RELATED APPLICATIONS

The present disclosure relates to subject matter contained in Korean Application No. 10-2004-0070198, filed on Sep. 3, 2004, which is herein expressly incorporated by reference its entirety.

BACKGROUND OF THE INVENTION

1. Field of the Invention

The present invention relates to a suspension system for a vehicle, and more particularly, to an integrated suspension system for a vehicle, wherein a shock-absorbing rate and a damping rate can be easily controlled without using a separate spring and damper, thereby maximizing productivity and economical efficiency.

2. Description of the Related Art

Generally, a suspension system is a system which connects an axle and a vehicle body of a vehicle and comprises a spring for absorbing shocks transmitted from a road during travel of the vehicle, a damper for absorbing free vibrations of the spring, and a stabilizer for preventing the vehicle from laterally rolling so as to improve a ride comfort of the vehicle.

Leaf springs, coil springs, torsion bar springs, rubber springs, air springs and the like are used as springs for suspension systems, and shock absorbers are generally used as damper devices.

Various types of springs and dampers described above are combined and used according to characteristics of vehicles. A conventional suspension system for a vehicle to which an air spring and a hydraulic damper are applied is provided with a controller for controlling a shock-absorbing rate of the air spring and another controller for controlling a damping rate of the hydraulic damper in order to properly control the shock-absorbing rate of the air spring and the damping rate of the hydraulic damper according to driving conditions of the vehicle, respectively.

In the conventional suspension system for the vehicle, however, since the shock-absorbing rate and the damping rate are controlled by the respective controllers which control the air spring and the hydraulic damper, there are technical problems in that control logic is very complicated and the suspension system should include a plurality of components.

SUMMARY OF THE INVENTION

The present invention is conceived to solve the aforementioned problems. An object of the present invention is to provide an integrated suspension system for a vehicle, wherein a shock-absorbing rate and a damping rate can be easily controlled by controlling an opening degree of passage holes formed in overlapped disks without using a separate spring and damper, thereby maximizing productivity and economical efficiency.

According to the present invention for achieving the object, there is provided an integrated suspension system comprising a cylinder that hermetically contains gas therein and is fixed to a vehicle body; a piston that has a motor at an upper portion thereof, supports a road wheel and is guided within the cylinder to move vertically; a disk unit including a second disk that has a plurality of passage holes formed therethrough and a bottom surface coupled to a driving shaft of the motor to rotate while moving vertically integrally along with the piston, and a first disk that has a plurality of passage holes and is stacked on and connected via a hinge to the center of a top surface of the second disk to move vertically within the cylinder integrally along with the second disk without any rotation; and a control unit for controlling an opening degree established through overlap of the passage holes formed in the first and second disks by changing power supplied to the motor to control a rotational angle of the second disk.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the present invention will be described in detail with reference to accompanying drawings.

Figure 1:
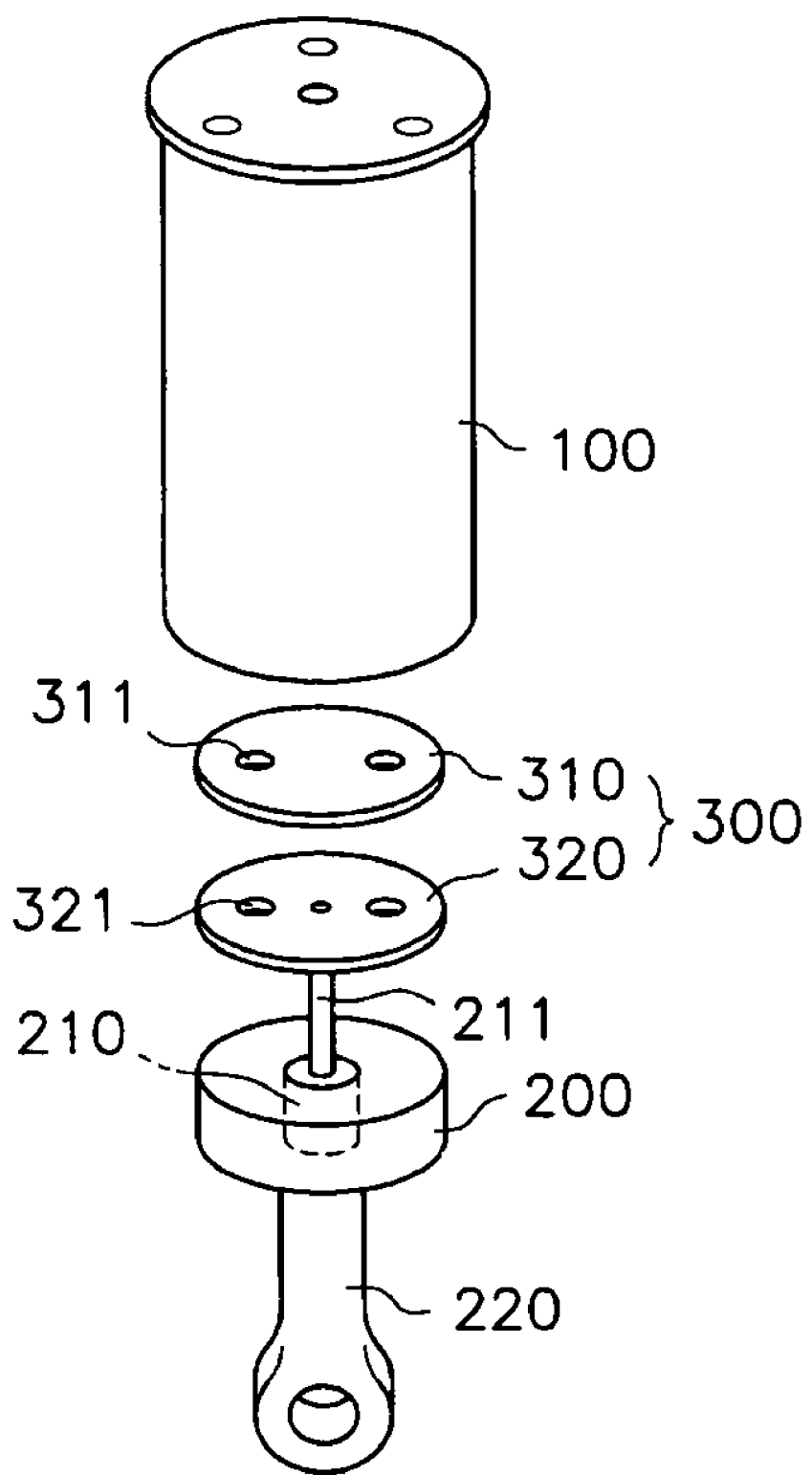
FIG. 1 is an exploded perspective view showing an integrated suspension system for a vehicle according to the present invention.
Figure 2:
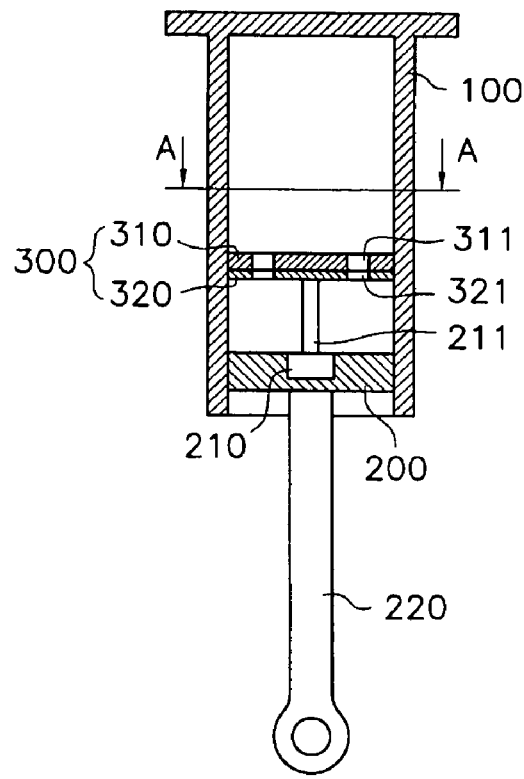
FIG. 2 is a side sectional view showing the integrated suspension system of the present invention.
Figure 3:
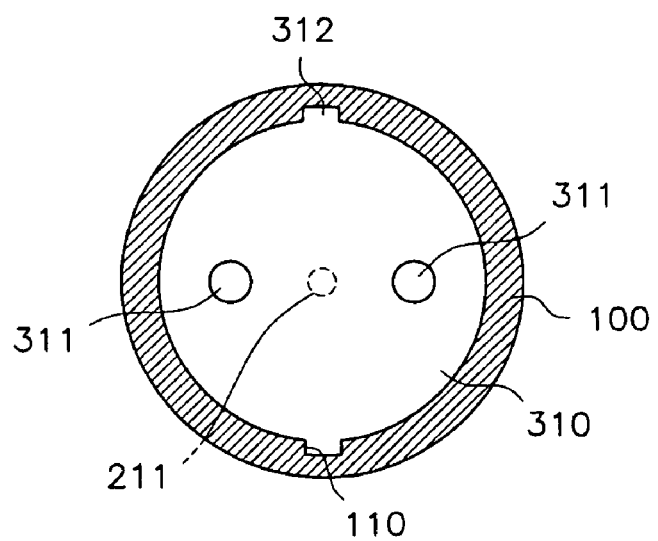
FIG. 3 is a sectional view taken along line A-A of FIG. 2.

FIG. 1 is an exploded perspective view showing an integrated suspension system for a vehicle according to the present invention, FIG. 2 is a side sectional view showing the integrated suspension system of the present invention, and FIG. 3 is a sectional view taken along line A-A of FIG. 2.

As shown in FIGS. 1 to 3, the integrated suspension system of the present invention comprises a cylinder 100 that hermetically contains gas therein and is fixed to a vehicle body; a piston 200 that has a motor 210 at an upper portion thereof, supports a road wheel and is guided within the cylinder 100 to move vertically; a disk unit 300 including a second disk 320 that has a plurality of passage holes 321 formed therethrough and a bottom surface coupled to a driving shaft 211 of the motor 210 to rotate while moving vertically integrally along with the piston 200, and a first disk 310 that has a plurality of passage holes 311 and is stacked on and connected via a hinge to the center of a top surface of the second disk 320 to move vertically within the cylinder 100 integrally along with the second disk 320 without any rotation; and a control unit for controlling an opening degree established through overlap of the passage holes 311 and 321 formed in the first and second disks 310 and 320 by changing power supplied to the motor 210 to control a rotational angle of the second disk 320.

Next, the operation of the present invention will be described with reference to FIGS. 1 to 3.

As shown in FIGS. 1 and 2, the integrated suspension system of the present invention constructed as above comprises the cylinder 100 fixed to the vehicle body, the piston 200 for supporting the road wheel via a piston rod 220, and the disk unit 300 that moves vertically within the cylinder 100 integrally along with the piston 200 and includes the first and second disks 310 and 320 which are vertically stacked and have the passage holes 311 and 321 formed therein, respectively.

At this time, a working fluid, e.g., gas, which can absorb shocks through volume changes for maintaining a constant volume is hermetically contained within the cylinder 100. To smoothly perform this operation, the piston 200 should move smoothly in a vertical direction while an outer circumferential surface of the piston 200 is in contact with an inner circumferential surface of the cylinder 100, and maintain airtightness between the piston and the cylinder to prevent the gas contained in the cylinder from leaking out.

The piston 200 is provided, at an upper central portion thereof, with the motor 210 that is connected to the control unit (not shown), such that the driving shaft 211 of the motor 210 extends upward. Since an upper end of the driving shaft 211 of the motor 210 is fixed to the center of the second disk 320 of the disk unit 300, the second disk 320 is rotated in response to rotation of the driving shaft 211 of the motor 210.

It is preferred that the motor 210 be a stepping motor capable of controlling the amount of rotation (i.e., rotational angle) of the driving shaft 211 according to the supply of power.

However, the first disk 310 stacked on and connected via the hinge to the center of the top surface of the second disk 320 is not rotated at all.

A variety of embodiments can be implemented so that even though the first disk 310 is connected via the hinge to the second disk 320, the first disk 310 cannot be rotated at all but only the second disk 320 can be rotated by the driving shaft 211 of the motor 210. Preferably, as shown in FIG. 3, longitudinal guide grooves 110 are formed in the inner circumferential surface of the cylinder 100 and guide projections 312 corresponding to the guide grooves 110 are formed on an outer periphery of the first disk 310.

That is, by forming one or more guide projections 312 on the outer periphery of the first disk 310 and by concavely cutting the guide grooves 110, which can receive and vertically guide the guide projections 312, in the inner circumferential surface of the cylinder 100, the first disk 310 can move vertically without rotation even though the second disk 320 is rotated.

In addition, the plurality of passage holes 311 and 321 are formed in the first and second disks 310 and 320 of the disk unit 320, respectively. At this time, the passage holes 311 and 312 are formed to have the same diameter at corresponding identical positions on the first and second disks 310 and 320.

According to such a structure, when the piston 200 moves vertically within the cylinder 100, the disk unit 300 connected to the driving shaft 211 of the motor 210 of the piston 200 also moves vertically together with the piston 200. Simultaneously, the control unit can control power supplied to the motor 210 to allow only the second disk 320 to rotate, so that the opening degree of the passage holes can be controlled according to changes in overlapped areas of the passage holes 311 formed in the non-rotating first disk 310 and the passage holes 321 formed in the rotating second disk 320.

That is, if the passage holes 321 of the second disk 320 are caused to coincide with the passage holes 311 of the first disk 310, the opening degree of the passage holes is 100%. In such a state, when only the second disk 320 is then rotated by the motor 210 through a certain angle with respect to the non-rotating first disk 310, the opening degree of the passage holes is reduced gradually and even to 0% by completely closing the passage holes 311 and 312.

Accordingly, when the piston 200 moves vertically within the cylinder 100 due to transmitted shocks during travel of the vehicle, the shock-absorbing rate can be easily adjusted by controlling the opening degree of the passage holes 311 and 321 of the disk unit 300.

Further, when the piston returns to its original position from a state where the piston 200 has deeply entered the cylinder 100, the damping rate can be adjusted by controlling the opening degree of the passage holes 311 and 321.

Figure 4:
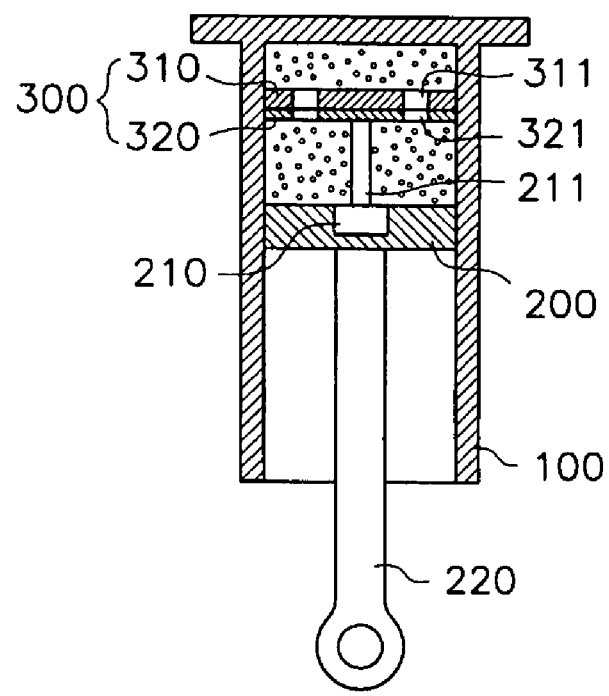
FIG. 4 is a sectional view showing the integrated suspension system of the present invention that is in a shock-absorbing state.
Figure 5:
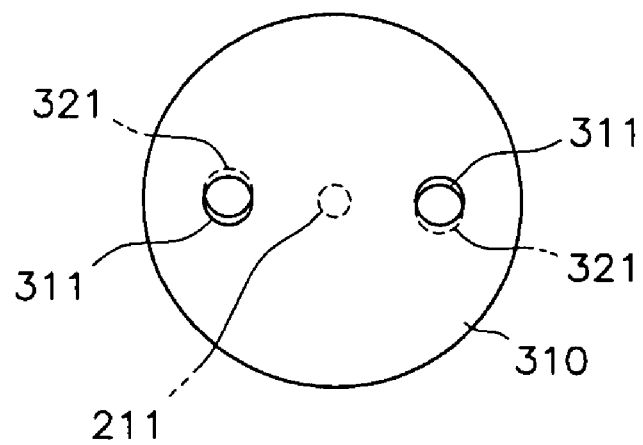
FIG. 5 is a plan view showing essential parts of the integrated suspension system of the present invention that is in the shock-absorbing state.
Figure 6:
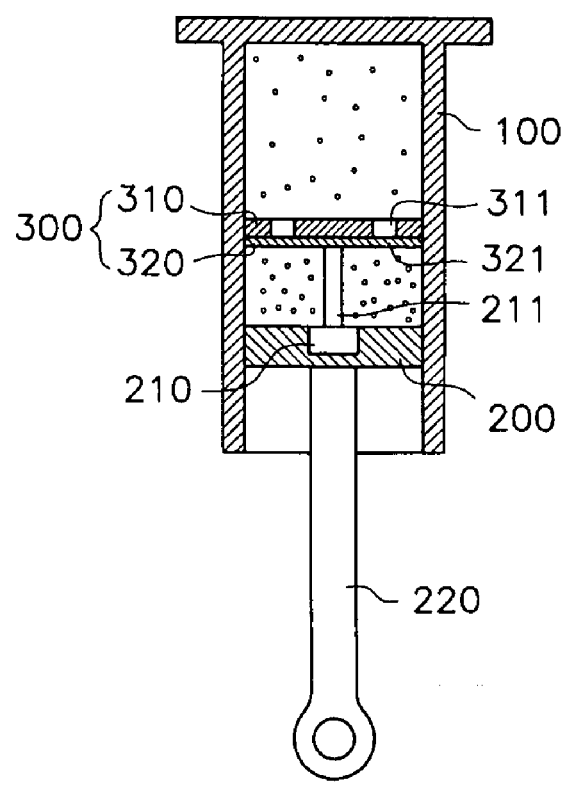
FIG. 6 is a sectional view showing the integrated suspension system of the present invention that is in a damping state.
Figure 7:
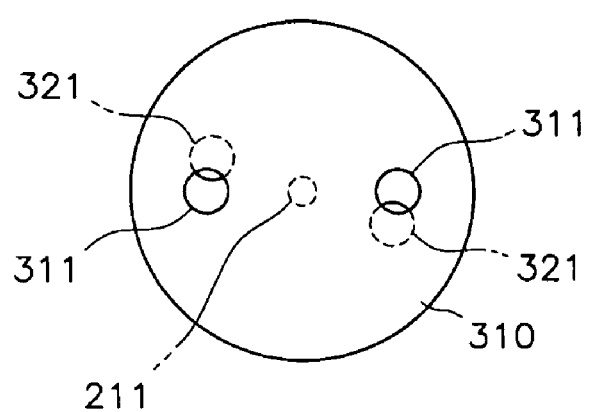
FIG. 7 is a plan view showing essential parts of the integrated suspension system of the present invention that is in the damping state.

FIGS. 4 and 5 are a sectional view showing the integrated suspension system of the present invention that is in a shock-absorbing state, and a plan view showing essential parts of the integrated suspension system in the shock-absorbing state, respectively. FIG. 6 is a sectional view showing the integrated suspension system of the present invention that is in a damping state, and FIG. 7 is a plan view showing essential parts of the integrated suspension system in the damping state, respectively.

Now, the operations of the integrated suspension system of the present invention in both the shock-absorbing state and the damping state will be described in detail with reference to FIGS. 4 to 7.

First, when the piston 200 moves upwardly within the cylinder 100 due to shocks transmitted form a road surface to the road wheel during travel of the vehicle, the disk unit 300 also moves upward along with the upwardly moving piston 200.

At this time, as shown in FIGS. 4 and 5, if the driving shaft 211 of the motor 210 is rotated through the control unit to perform an adjustment for increasing the opening degree of the passage holes 311 and 321 established by the overlap of the first and second disks 310 and 320, the same pressure is exerted on both gas existing above the disk unit 300 and gas existing between the disk unit 300 and the piston 200. Therefore, since the pressure is exerted on a relatively large amount of gas, relatively soft shock absorption can be achieved.

On the other hand, if the opening degree of the passage holes 311 and 321 is adjusted to be smaller, pressure larger than that exerted on the gas existing between the disk unit 300 and the piston 200 is exerted on the gas existing above the disk unit 300. Therefore, since the pressure is exerted on a relatively small amount of gas, relatively hard shock absorption can be achieved.

After the shocks have been absorbed while the volume of the gas decreases due to the pressure exerted on the gas as described above, the compressed gas expands to its original volume and the piston 200 that has been moved upwardly then returns to its initial position along with the disk unit 300.

At this time, if the driving shaft 211 of the motor 210 is rotated through the control unit to perform an adjustment for increasing the opening degree of the passage holes 311 and 321 established by the overlap of the first and second disks 310 and 320, both the gas existing above the disk unit 300 and the gas existing between the disk unit 300 and the piston 200 expand within a short time to a state prior to the application of the shocks. Therefore, a relatively low damping rate is obtained.

As shown in FIGS. 6 and 7, on the other hand, if the opening degree of the passage holes 311 and 321 is adjusted to be smaller, the gas existing above the disk unit 300 rapidly expands within a short time to a state prior to the application of the shocks, whereas the gas existing between the disk unit 300 and the piston 200 expands through narrow overlapped areas of the passage holes 311 and 321 for a relatively long time. Therefore, a relatively high damping rate is obtained.

Therefore, since the integrated suspension system of the present invention can easily control the shock-absorbing rate and the damping rate with a simple structure by adjusting the opening degree of the passage holes 311 and 321 of the simply stacked first and second disks 310 and 320, control logic is very simple and the suspension system can be constructed using an extremely small number of components. Accordingly, the present invention can greatly improve productivity and economical efficiency.

According to the present invention described above, the shock-absorbing rate and the damping rate can be easily controlled by adjusting the opening degree of the passage holes formed in the overlapped first and second disks without using a separate spring and damper. Accordingly, there is an advantage in that productivity and economical efficiency can be greatly improved.

What is claimed is:

1. An integrated suspension system for a vehicle, comprising:
   a cylinder with gas hermetically contained therein;
   a piston with a motor at an upper portion thereof, the piston configured to support a road wheel and being guided within the cylinder to move vertically;
   a disk unit comprising first and second disks, wherein the second disk has a plurality of second passage holes formed therethrough and a bottom surface coupled to a driving shaft of the motor to rotate while moving vertically integrally with the piston, and the first disk having a plurality of first passage holes, the first disk being stacked on and hingedly connected to the center of a top surface of the second disk to move vertically within the cylinder, and integrally with the second disk, wherein the first disk moves without rotation relative to the cylinder, and wherein the driving shaft of the motor is connected to a center of the second disk; and
   a control unit that controls an opening degree established through overlap of the passage holes in the first and second disks by changing power supplied to the motor to control a rotational angle of the second disk.

2. The suspension system as claimed in claim 1, wherein the cylinder has a longitudinal guide groove formed in an inner circumferential surface thereof, and the first disk has a guide projection corresponding to the guide groove on an outer periphery thereof.

3. The suspension system as claimed in claim 1, wherein the cylinder has a plurality of longitudinal guide grooves formed in an inner circumferential surface thereof, and the first disk has a plurality of guide projections, corresponding to the guide grooves, and provided on an outer periphery thereof.

4. The suspension system as claimed in claim 1, wherein the motor is a stepping motor configured to control the rotational angle of the driving shaft in accordance with the power supplied to the motor.

5. The suspension system as claimed in claim 1, wherein the plurality of first passage holes have a diameter equal to a diameter of the plurality of second passage holes.

6. The suspension system as claimed in claim 5, wherein a location of the plurality of first passage holes formed on the first disk correspond to a location of the plurality of second passage holes formed on the second disk, such that the plurality of first passage holes and the plurality of second passage holes are configured to be bought into axial alignment when the second disk is rotated to a predetermined orientation of the first and second disks.

* * * * *